US012228266B1

(12) United States Patent
Alexander

(10) Patent No.: US 12,228,266 B1
(45) Date of Patent: Feb. 18, 2025

(54) SAFETY LIGHT DEVICE

(71) Applicant: Nite Beams Technology, LLC, Kalamazoo, MI (US)

(72) Inventor: Michael Alexander, Portage, MI (US)

(73) Assignee: Night Beams Technology, LLC, Kalamazoo, MI (US)

( * ) Notice: Subject to any disclaimer, the term of this patent is extended or adjusted under 35 U.S.C. 154(b) by 0 days.

(21) Appl. No.: 18/721,414

(22) PCT Filed: Dec. 16, 2022

(86) PCT No.: PCT/US2022/053151
§ 371 (c)(1),
(2) Date: Jun. 18, 2024

(87) PCT Pub. No.: WO2023/121962
PCT Pub. Date: Jun. 29, 2023

Related U.S. Application Data

(60) Provisional application No. 63/293,182, filed on Dec. 23, 2021.

(51) Int. Cl.

| | |
|---|---|
| ***F21S 9/03*** | (2006.01) |
| ***E01F 9/615*** | (2016.01) |
| ***E01F 9/654*** | (2016.01) |
| ***F21V 21/088*** | (2006.01) |
| ***F21V 21/096*** | (2006.01) |
| ***F21V 23/06*** | (2006.01) |
| ***F21W 111/02*** | (2006.01) |

(Continued)

(52) U.S. Cl.
CPC .............. *F21S 9/037* (2013.01); *E01F 9/615* (2016.02); *E01F 9/617* (2016.02); *E01F 9/654* (2016.02); *F21V 21/088* (2013.01); *F21V 21/096* (2013.01); *F21V 23/06* (2013.01); *F21W 2111/02* (2013.01); *F21W 2131/103* (2013.01); *F21Y 2105/18* (2016.08); *F21Y 2113/13* (2016.08); *F21Y 2115/10* (2016.08)

(58) Field of Classification Search
CPC ............ E01F 9/615; E01F 9/617; E01F 9/654
See application file for complete search history.

(56) References Cited

U.S. PATENT DOCUMENTS 3,819,924 A * 6/1974 Thomas .................. F21S 6/002
362/127
5,469,342 A * 11/1995 Chien .................... A42B 1/242
224/660

(Continued)

FOREIGN PATENT DOCUMENTS

GB 2353946 A 3/2001
WO WO-2023205885 A1 * 11/2023

OTHER PUBLICATIONS

Apr. 5, 2023 PCT/US2022/53151 International Search Report and Written Opinion (8 pages).

*Primary Examiner* — William N Harris
(74) *Attorney, Agent, or Firm* — Honigman LLP; Andrew S. Chipouras; Jonathan P. O'Brien

(57) ABSTRACT

A safety light device includes a body defining a central bore and having a generally annular shape, a pair of teeth configured to extend into the central bore in an extended position and retract into the body in a retracted position, a charging system configured to charge a battery, and a plurality of light-emitting diodes (LEDs) disposed on an outer portion of the body.

19 Claims, 8 Drawing Sheets

(51) Int. Cl.

| | |
|---|---|
| ***F21W 131/103*** | (2006.01) |
| ***F21Y 105/18*** | (2016.01) |
| ***F21Y 113/13*** | (2016.01) |
| ***F21Y 115/10*** | (2016.01) |

(56) References Cited

U.S. PATENT DOCUMENTS

| | | | | |
|---|---|---|---|---|
| 6,448,902 | B1 * | 9/2002 | Tung | B60Q 7/00 340/471 |
| 6,499,858 | B2 * | 12/2002 | Hart | F21S 9/037 362/183 |
| 7,997,764 | B1 * | 8/2011 | Nielson | E01F 9/688 362/183 |
| 11,682,273 | B2 * | 6/2023 | Destrian | E01F 9/615 362/257 |
| 2004/0218381 | A1 * | 11/2004 | Sawyer | E01F 9/688 362/157 |
| 2008/0180032 | A1 | 7/2008 | Kim et al. | |
| 2013/0241419 | A1 | 9/2013 | Ghafoori et al. | |
| 2019/0100889 | A1 | 4/2019 | Koyle et al. | |
| 2019/0177934 | A1 * | 6/2019 | Mueller | G09F 17/00 |
| 2021/0237777 | A1 * | 8/2021 | Selevan | G06V 20/56 |
| 2023/0340738 | A1 * | 10/2023 | Selevan | E01F 9/654 |

* cited by examiner

SAFETY LIGHT DEVICE

CROSS-REFERENCE TO RELATED APPLICATIONS

The present application is a national phase application of PCT/US2022/053151, filed Dec. 16, 2022, which claims priority to and the benefit of U.S. Provisional Application No. 63/293,182, filed Dec. 23, 2021, the contents of which are herein incorporated by reference in their entireties.

FIELD

The present disclosure relates generally to safety light devices.

BACKGROUND

This section provides background information related to the present disclosure which is not necessarily prior art.

Road flares may be used to alert approaching drivers of an upcoming incident, such as an automobile accident, road construction, an obstacle or spill on the road, or any other suitable incident. Traffic cones may be used under similar circumstances and in other environments, such as construction, industrial operations, and/or any other suitable environment. While these devices may provide notice to a driver or other person of an upcoming incident, there is a need in the art for an improved safety device to ensure that all persons are adequately put on notice for an upcoming incident that requires them to proceed with caution.

SUMMARY

This section provides a general summary of the disclosure, and is not a comprehensive disclosure of its full scope or all of its features.

In one implementation, a safety light device includes a body defining a central bore and having a generally annular shape, a pair of teeth configured to extend into the central bore in an extended position and retract into the body in a retracted position, a charging system configured to charge a battery, and a plurality of light-emitting diodes (LEDs) disposed on an outer portion of the body.

Implementations of the disclosure include one or more of the following features. In some implementations, each tooth of the pair of teeth includes a distal end having a slanted surface. Each slanted surface may slant away from a center of the central bore in a direction from a top surface of the body toward a bottom surface of the body. Each distal end may be configured to engage a traffic cone.

The charging system may include a charging port. The charging system may include a USB port.

The safety light device may include one or more magnets disposed on the body.

The plurality of LEDs may be configured to display a plurality of different colors.

The safety light device may include a pair of actuators configured to cause the teeth to extend into the extended position and retract into the retracted position.

In another implementation, a safety light device includes a body defining a central bore and having a generally annular shape, a tooth configured to extend into the central bore in an extended position and retract into the body in a retracted position, an actuator configured to cause the tooth to extend into the extended position and retract into the retracted position, a charging system configured to charge a battery, and a plurality of light-emitting diodes (LEDs) disposed on an outer portion of the body.

Implementations of the disclosure include one or more of the following features. In some implementations, the tooth includes a distal end having a slanted surface. The slanted surface slants away from a center of the central bore in a direction from a top surface of the body toward a bottom surface of the body. The distal end may be configured to engage a traffic cone. The slanted surface may have a higher coefficient of friction than the rest of the tooth.

The charging system may include one or more solar panels disposed on the body. The charging system may include a charging port. The charging system may include a USB port.

The safety light device may include one or more magnets disposed on the body.

The plurality of LEDs may extend completely around the outer portion of the body and be configured to display light in 360 degrees around the outer portion of the body. The plurality of LEDs may be configured to display a plurality of different colors.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
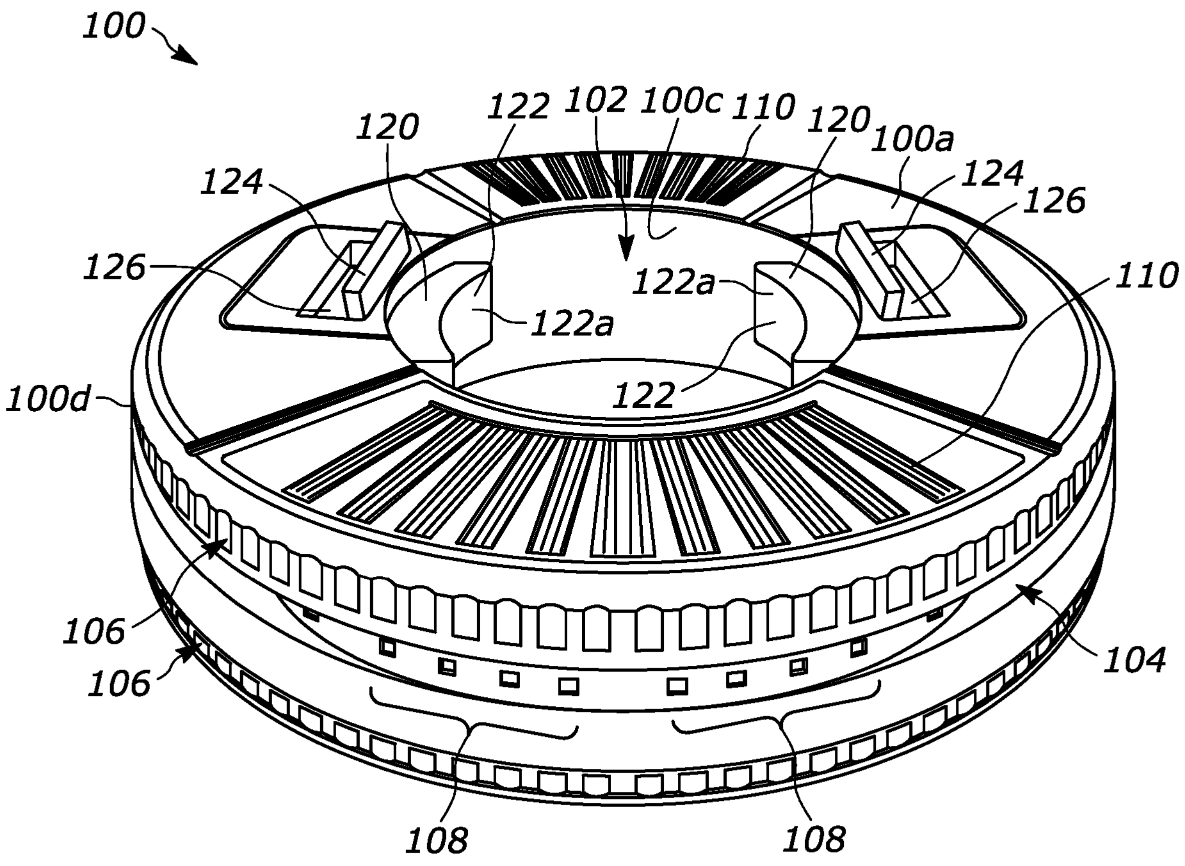
FIG. 1 is a perspective view of a safety light device in accordance with the present disclosure.

Referring to FIG. 1, a safety light device 100 is generally shown. The safety light device 100 may be used in a variety of different environments and for a variety of different applications. As just one example, the safety light device 100 may be used as road flares to alert approaching drivers of an upcoming incident. As another example, the safety light device may be used in an industrial environment to alert persons of the presence of a chemical or flammable spill. As yet another example, the safety light device 100 may be used for any suitable application in which it is beneficial to provide a light alert or indicator.

The safety light device 100 includes a body having a generally annular shape defined by a top surface 100*a*, a bottom surface 100*b*, an inner radial surface 100*c*, and an outer radial surface 100*d*. The safety light device 100 may be built of a durable and waterproof material such as any suitable plastic, thermoplastic, or polymer. The entire safety light device 100 may be waterproof to enable use of the safety light device 100 in rain, snow, or other wet environments.

The inner radial surface 100*c* defines a central bore 102 extending through the safety light device 100. The central bore 102 may be sized to receive a traffic cone. For example, referring to FIG. 2, a first traffic cone 10 may include a base 12 and a conical portion 14 having an outer surface 14*a*. The central bore 102 may be sized to receive the conical portion 14 with the inner radial surface 100*c* abutting the outer surface 14*a* of the conical portion 14.

Figure 3:
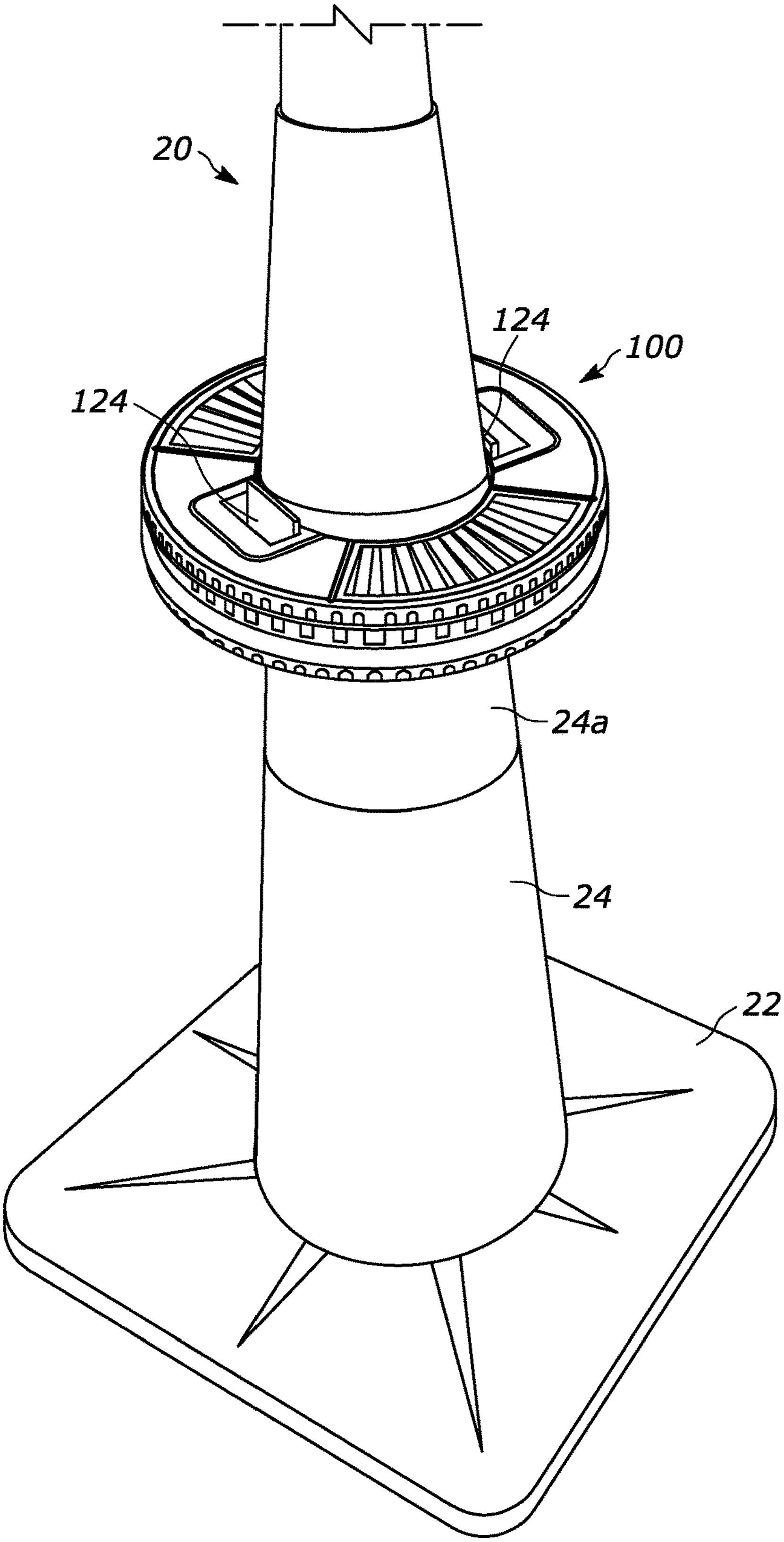
FIG. 3 is a perspective view of the safety light device of FIG. 1 disposed on a second traffic cone.

As another example, referring to FIG. 3, a second traffic cone 20 may include a base 22 and a conical portion 24 having an outer surface 24*a*. The conical portion 24 may be a different size (i.e., diameter) than the conical portion 14 of the first cone 10. The central bore 102 may be sized to receive the conical portion 24 such that a pair of teeth 120 engage the outer surface 24*a*, as will be described in greater detail below.

The safety light device 100 may include an outer slot or groove 104 extending completely around the body. The safety light device 100 may include gripping features 106 adjacent to and on either side of the slot 104. As shown, the gripping features 106 may be a plurality of indentations. However, it should be understood that any suitable gripping feature is contemplated, including, but not limited to, a material having a higher coefficient of friction that the rest of the body (e.g., rubber), a plurality of grooves, a plurality of dimples, etc. The gripping features 106 are configured to improve a user's grip of the safety light device 100.

Figure 7:
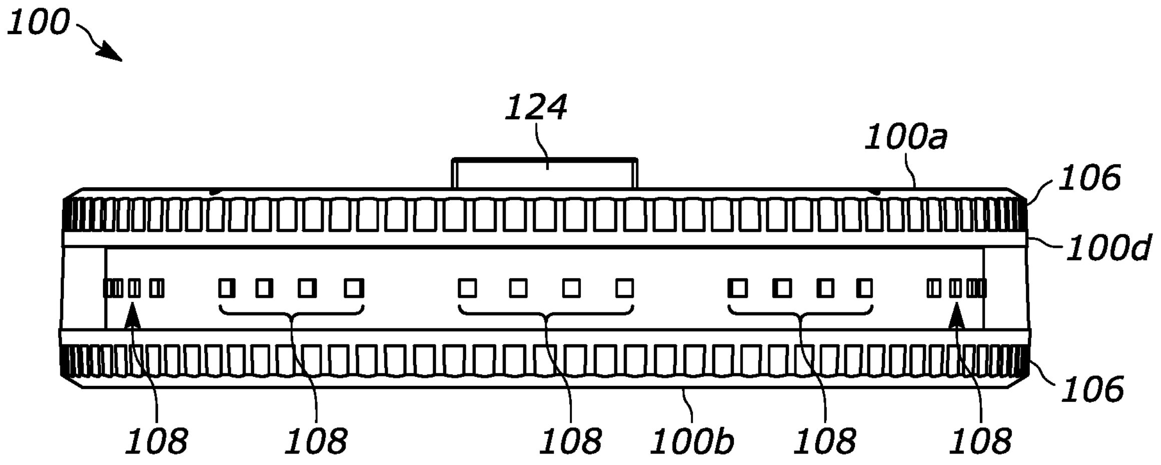
FIG. 7 is a side plan view of a first side of the safety light device of FIG. 1.
Figure 8:
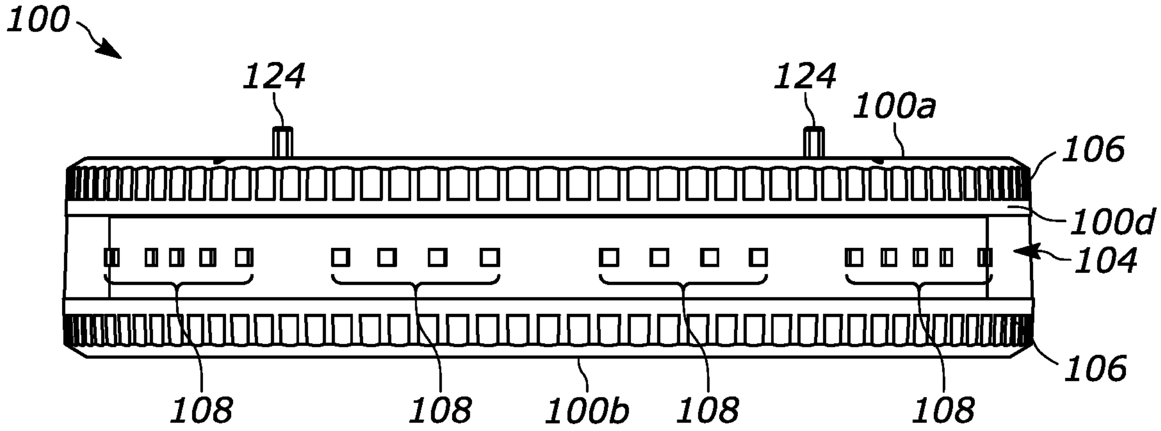
FIG. 8 is a side plan view of a second side of the safety light device of FIG. 1, the second side being 90 degrees from the first side.

Referring to FIG. 1, the safety light device 100 includes a plurality of light emitting diodes (LEDs) 108 disposed in the slot 104. The LEDs 108 extend completely around the body in 360 degrees to ensure that the LEDs 108 are visible from any angle, as shown in FIGS. 7 and 8. In some embodiments, the LEDs 108 may be separated into groups of four LEDs 108. Alternatively, the LEDs 108 may be evenly spaced from one another or have any suitable arrangement. The LEDs 108 may be electrically connected to a battery (not shown) of the safety light device 100 to power the LEDs 108. The LEDs 108 may be configured to display a plurality of different colors. For example, the LEDs 108 may display amber, blue, green, red, white, or any other suitable color. In some implementations, each LED 108 may be configured to display the same color as the other LEDs 108. In other implementations, each LED 108 may be configured to display any suitable color compared to the other LEDs 108.

The safety light device 100 may include a charging system to charge the battery. In some implementations, the charging system may include one or more solar panels 110 disposed on the top surface 100*a*. For example, the safety light device 100 includes two solar panels 110 opposite one another on the top surface 100*a*. As another example, the safety light device 100 may include any suitable number of solar panels 110. When the safety light device 100 is used in an outdoor environment, the solar panels 110 use the sun to continuously charge the battery of the safety light device 100.

Additionally or alternatively, the charging system may include a universal serial bus (USB) port 114 that is covered by a USB flap 112 to protect the USB port 114 from dirt, water, and/or other debris. The USB port 114 may be configured to receive a USB cable that can be connected to a power source (e.g., a wall power receptacle, an automobile outlet, etc.) to charge the battery.

Figure 6:
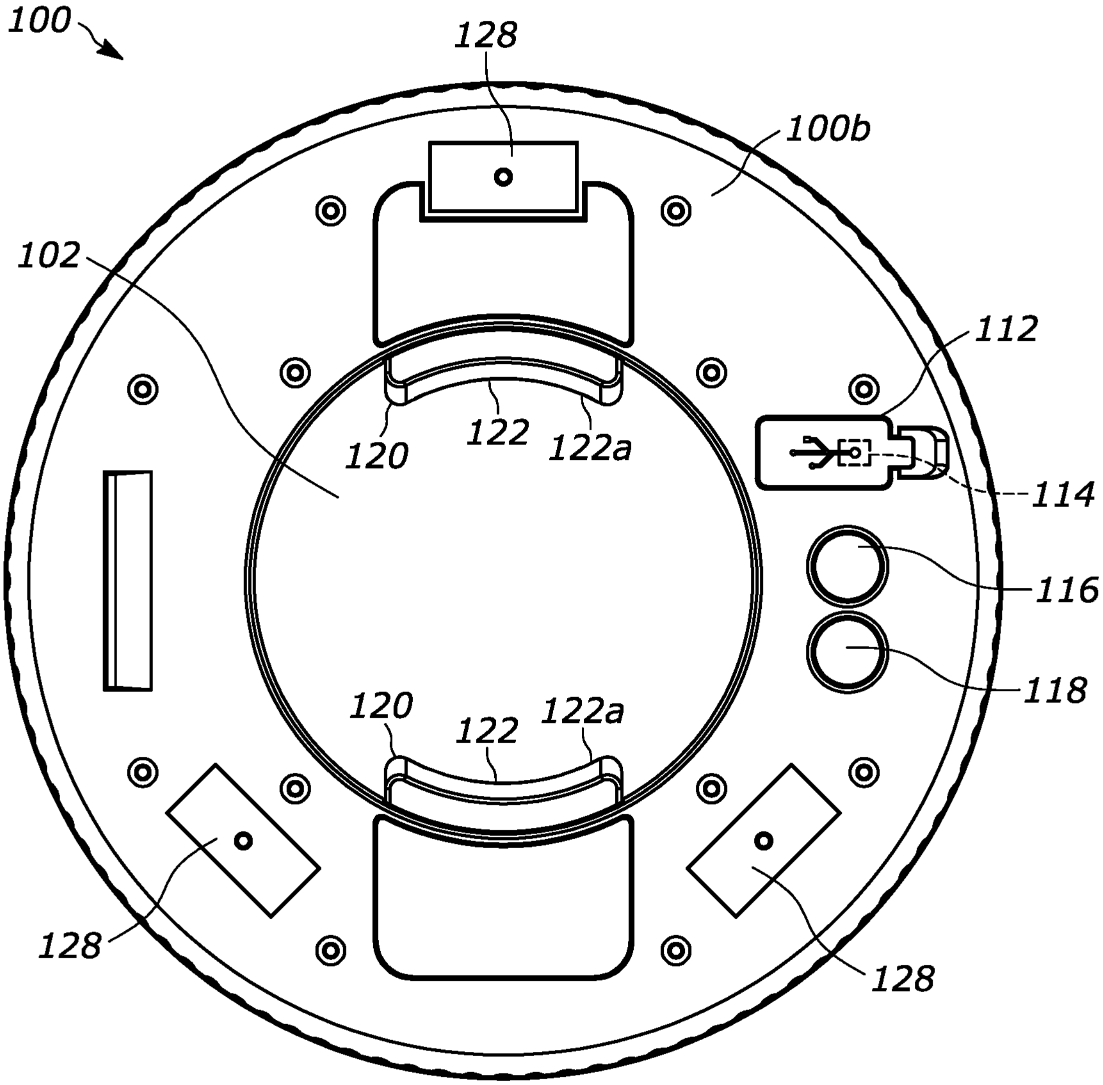
FIG. 6 is a bottom plan view of the safety light device of FIG. 1 with the pair of teeth in the extended position.

Referring to FIG. 6, the safety light device 100 includes a power button 116 and a light-adjust button 118. The buttons 116, 118 may be disposed on the bottom surface 100*b*, or the buttons 116, 118 may be disposed in any suitable location on the safety light device 100. The power button 116 is configured to power on the LEDs 108 upon actuation of the power button 116 and power off the LEDs 108 upon actuation of the power button 116. The light-adjust button 118 is configured to change a characteristic of the LEDs 108. In some implementations, the light-adjust button 118 may change the color of the LEDs 108. In other implementations, the light-adjust button 118 may change the brightness of the LEDs 108. In yet other implementations, the light-adjust button 118 may change a strobe effect of the LEDs 108 so the LEDs 108 are blinking or flashing.

Figure 2:
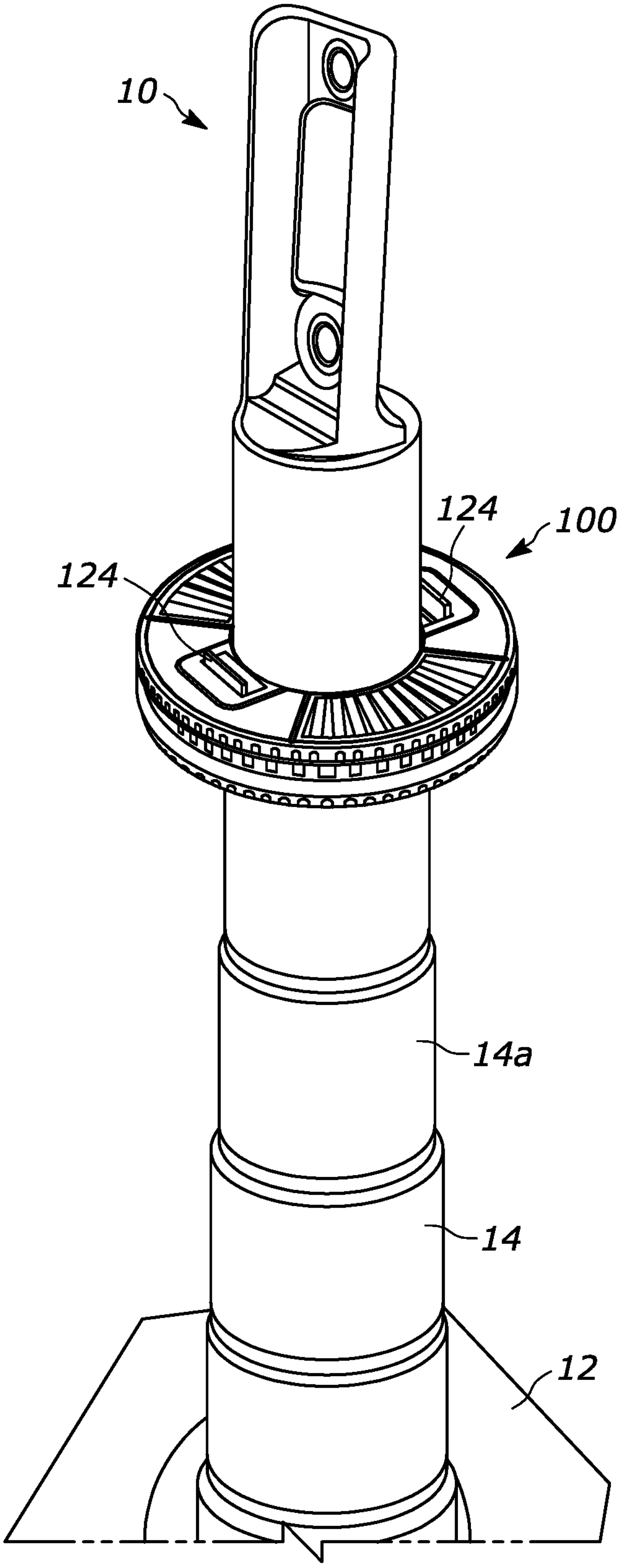
FIG. 2 is a perspective view of the safety light device of FIG. 1 disposed on a first traffic cone.
Figure 4:
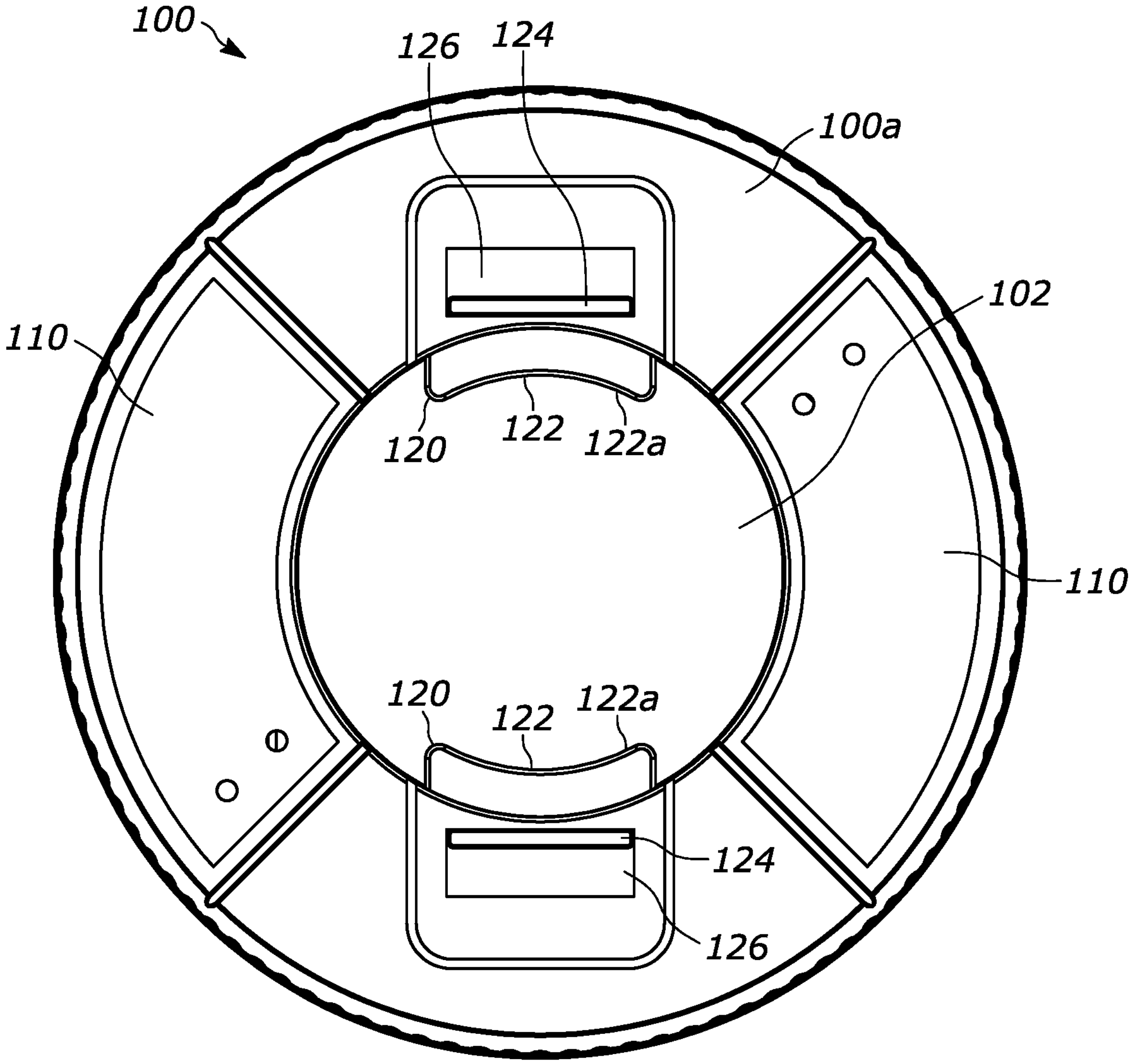
FIG. 4 is a top plan view of the safety light device of FIG. 1 with a pair of teeth in an extended position.
Figure 5:
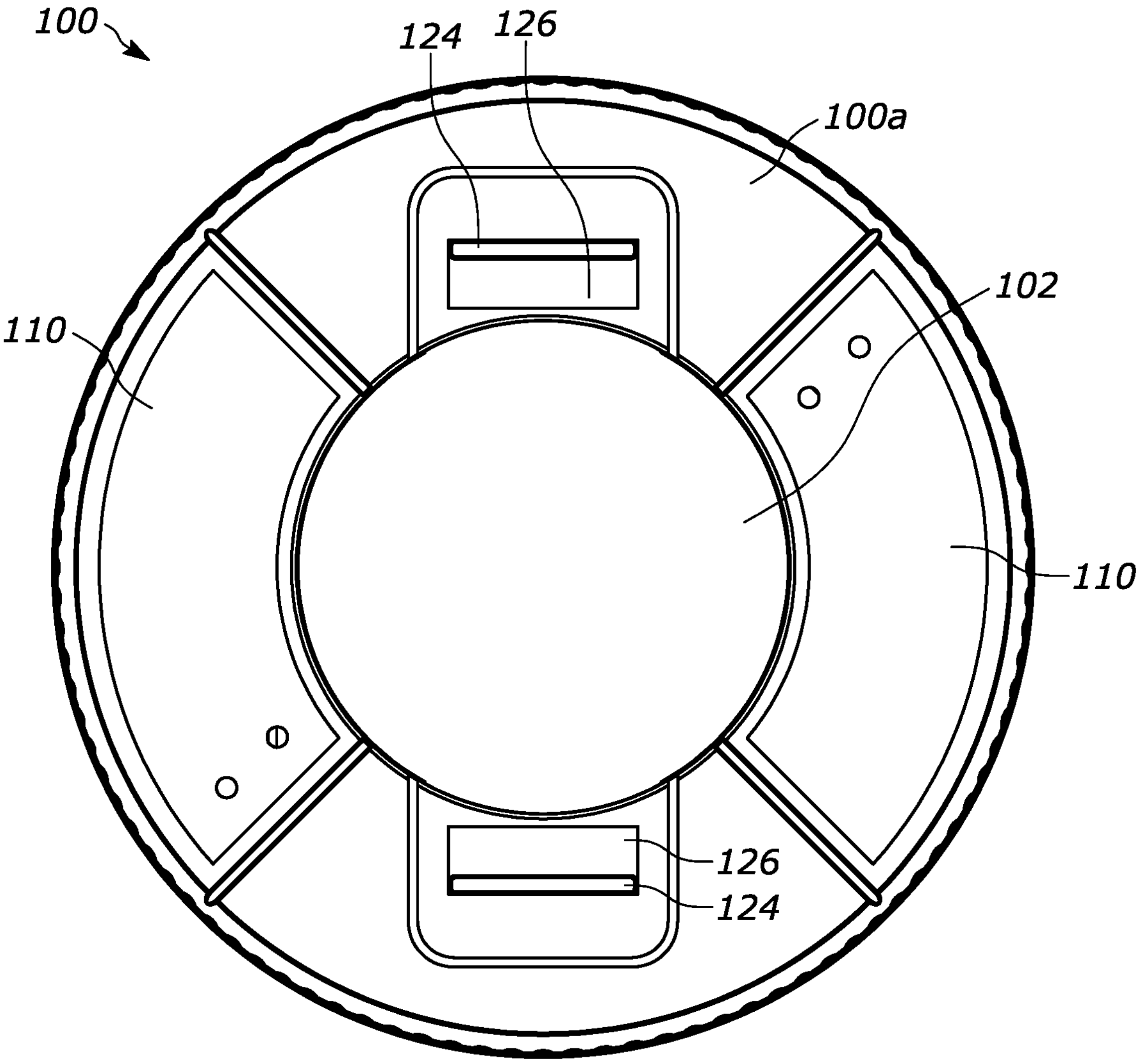
FIG. 5 is a top plan view of the safety light device of FIG. 1 with the pair of teeth in a retracted position.

Referring to FIGS. 4-6, the safety light device 100 includes one or more teeth 120 adjacent the inner radial surface 100*c*. The teeth 120 operate between an extended position (as shown in FIGS. 3, 4, and 6) and a retracted position (as shown in FIGS. 2 and 5). In the extended position, the teeth 120 extend into the central bore 102, and, in the retracted position, the teeth 120 retract into the body to be substantially flush with the inner radial surface 100*c*. Each tooth 120) includes a distal end 122 having a slanted surface 122*a*. The slanted surface 122*a* slants away from a center of the central bore 102 in a direction from the top surface 100*a* toward the bottom surface 100*b*. The slanted surface 122*a* is designed to align with the angle of a traffic cone such that the slanted surface 122*a* can engage the outer surface 24*a* of the conical portion 24 of the traffic cone 20.

The slanted surface 122*a* may include a higher coefficient of friction than the rest of the tooth 120. For example, the slanted surface 122*a* may include a different material than the rest of the tooth 120, such as rubber or any other suitable material. As another example, the slanted surface 122*a* may include a plurality of protrusions or indentations designed to increase the friction between the slanted surface 122*a* and the outer surface 24*a* of the conical portion 24.

The teeth 120 may be actuated between the extended position and the retracted position via a pair of corresponding actuators 124. In some implementations, each actuator 124 may be disposed in a slot 126 in the top surface 100*a* of the safety light device 100, and the actuator 124 may be integrally formed with the respective tooth 120 such that the tooth 120 moves with the actuator 124. In other embodiments, the actuators 124 may be any suitable electrical and/or mechanical mechanism to actuate the teeth 120 between the extended position and the retracted position. The actuator 124 may be formed as a flange integrally formed with the respective tooth 120 and extending perpendicular to the tooth 120 through the slot 126. The slot 126 may be configured to allow the actuator 124, when in the form of a flange, to slide back and forth causing the tooth 120 to extend and retract, so as to engage and disengage with a cone.

Referring to FIG. 6, the safety light device 100 may include one or more magnets 128 disposed on the bottom surface 100*b* of the body. The magnets 128 may be disposed within the body such that the magnets 128 are flush with the bottom surface 100*b*. The safety light device 100 may be attached to any suitable surface, such as the body of a vehicle, a shelf, a toolbox, etc., via the magnets 128.

The safety light device of the present disclosure is advantageously employed by placing onto a cone, e.g., as shown in FIGS. 2 and 3. When placed on a cone, the safety light device is oriented horizontally and projects light in 360 degrees. This allows the light to be visible in all directions. In traffic applications, this means the light is visible to traffic moving in all directions. The safety light device is useful in many applications and particularly in traffic safety applications. Cones are used prevalently in traffic safety applications and therefore a light that fits on a cone and that will reliably stay with the cone is highly useful. The rechargeable battery and solar panels are useful for portable applications and allow for long use times, which is also beneficial for traffic safety applications. The different color settings are also useful for particular applications where the color of light is associated with a different traffic condition, such as red and blue lights to indicate a police traffic site.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed above could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A safety light device comprising:
- a body defining a central bore and having a generally annular shape;
- a pair of teeth configured to extend into the central bore in an extended position and retract into the body in a retracted position and a pair of actuators configured to cause the teeth to extend into the extended position and retract into the retracted position;
- a charging system configured to charge a battery; and
- a plurality of light-emitting diodes (LEDs) disposed on an outer portion of the body.

2. The safety light device of claim 1, wherein each tooth of the pair of teeth includes a distal end having a slanted surface.

3. The safety light device of claim 2, wherein each slanted surface slants away from a center of the central bore in a direction from a top surface of the body toward a bottom surface of the body.

4. The safety light device of claim 2, wherein each distal end is configured to engage a traffic cone.

5. The safety light device of claim 1, wherein the charging system includes one or more solar panels disposed on the body.

6. The safety light device of claim 1, wherein the charging system includes a charging port.

7. The safety light device of claim 1, further comprising one or more magnets disposed on the body.

8. The safety light device of claim 1, wherein the plurality of LEDs extend completely around the outer portion of the body and are configured to display light in 360 degrees around the outer portion of the body.

9. The safety light device of claim 1, wherein the plurality of LEDs are configured to display a plurality of different colors.

10. A safety light device comprising:
- a body defining a central bore and having a generally annular shape;
- a tooth configured to extend into the central bore in an extended position and retract into the body in a retracted position;
- an actuator configured to cause the tooth to extend into the extended position and retract into the retracted position;
- a charging system configured to charge a battery; and
- a plurality of light-emitting diodes (LEDs) disposed on an outer portion of the body.

11. The safety light device of claim 10, wherein the tooth includes a distal end having a slanted surface.

12. The safety light device of claim 11, wherein the slanted surface slants away from a center of the central bore in a direction from a top surface of the body toward a bottom surface of the body.

13. The safety light device of claim 11, wherein the distal end is configured to engage a traffic cone.

14. The safety light device of claim 11, wherein the slanted surface has a higher coefficient of friction than the rest of the tooth.

15. The safety light device of claim 10, wherein the charging system includes one or more solar panels disposed on the body.

16. The safety light device of claim 10, wherein the charging system includes a charging port.

17. The safety light device of claim 10, wherein the plurality of LEDs extend completely around the outer portion of the body and are configured to display light in 360 degrees around the outer portion of the body.

18. The safety light device of claim 10, further comprising one or more magnets disposed on the body.

19. The safety light device of claim 10, wherein the plurality of LEDs are configured to display a plurality of different colors.

* * * * *